US008422501B2

(12) United States Patent
Das et al.

(10) Patent No.: US 8,422,501 B2
(45) Date of Patent: Apr. 16, 2013

(54) EFFICIENT PATH MAXIMUM TRANSMISSION UNIT INFORMATION DISCOVERY AND STORAGE

(75) Inventors: Ranadip Das, West Bengal (IN); Vinit Jain, Austin, TX (US); Uma Krishnan, Austin, TX (US); Venkat Venkatsubra, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 674 days.

(21) Appl. No.: 11/619,676

(22) Filed: Jan. 4, 2007

(65) Prior Publication Data

US 2008/0165775 A1 Jul. 10, 2008

(51) Int. Cl.
*H04L 12/56* (2006.01)
*H04L 12/28* (2006.01)
*G06F 11/00* (2006.01)

(52) U.S. Cl.
USPC .......................... 370/392; 370/401; 709/238

(58) Field of Classification Search .................. 370/252, 370/351, 477; 709/238
See application file for complete search history.

(56) References Cited

U.S. PATENT DOCUMENTS

| 5,809,254 A | 9/1998 | Matsuzono | |
|---|---|---|---|
| 2003/0188015 A1* | 10/2003 | Lee et al. | 709/238 |
| 2004/0090922 A1* | 5/2004 | Jason et al. | 370/252 |
| 2005/0041635 A1* | 2/2005 | Chung et al. | 370/351 |
| 2005/0281288 A1* | 12/2005 | Banerjee et al. | 370/477 |

OTHER PUBLICATIONS

Mogul et al., "Path MTU Discovery", Network Working Group Request for Comments 1191, Nov. 1990, pp. 1-19.*

* cited by examiner

*Primary Examiner* — Marsha D. Banks Harold
*Assistant Examiner* — Matthew Campbell
(74) *Attorney, Agent, or Firm* — Yudell Isidore Ng Russell PLLC (57) ABSTRACT

A method, computer program product, and data processing system for efficiently discovering and storing path MTU information in a sending host are disclosed. In a preferred embodiment, two path MTU tables are maintained. One path MTU table contains MTU values corresponding to the first-hop routers associated with the sending host. The other path MTU table contains MTU values corresponding to individual destination hosts. When the sending host needs to send information to a destination, it first consults the MTU table associated with individual destination hosts. If an entry for that destination host is found in the table, the sending host uses that MTU value. If not, the sending host consults the MTU table for the first-hop router on the path to the destination host and uses that MTU value. If that MTU value is too high, a new entry is made in the host-specific MTU table for the destination host.

28 Claims, 4 Drawing Sheets

Fig. 1

| 1st Hop Router | MTU |
|---|---|
| 128.54.29.1 | 1500 |
| 128.54.29.2 | 600 |
| 128.54.29.3 | 900 |
| 128.54.29.4 | 1200 |

200

| Destination Host | MTU |
|---|---|
| 196.2.78.4 | 200 |
| 24.1.7.8 | 600 |
| 154.65.3.20 | 800 |
| 121.54.46.75 | 1200 |
| 96.76.42.82 | 750 |
| 203.84.191.68 | 256 |
| 73.9.5.2 | 768 |
| 192.5.34.9 | 1400 |

EFFICIENT PATH MAXIMUM TRANSMISSION UNIT INFORMATION DISCOVERY AND STORAGE

BACKGROUND OF THE INVENTION

1. Technical Field

The present invention relates generally to computer networking and more particularly to the problem of keeping track of a working maximum transfer unit (MTU) value associated with a destination host.

2. Description of the Related Art

Modern telecommunications depends on networks. A network is a set of interconnected machines (network elements) that allow data to be relayed across the set of machines from a source to a destination. Networks may be classified according to the geographic area they occupy. A local area network (LAN) is usually defined as a network that is physically limited to a relatively small area, such as a building or group of buildings. A wide area network (WAN) is a general term for a network of larger size.

An internetwork, or internet, is a collection of networks interconnected by routers. Routers are network elements that relay (route) data between networks. Most WANs are internets composed of multiple interconnected LANs. Thus, the term WAN is often used to refer to an internet, while the term LAN is often used to denote a constituent network of an internet or WAN. In this document, the terms WAN and LAN are used in this "internetworking" sense, with the caveat that in a significant amount of computing and telecommunications literature the terms LAN and WAN is also used in the previously mentioned "geographical" sense. The "worldwide Internet" or simply "Internet" (uppercase), which provides the backbone for the World Wide Web, is perhaps the best known internet (lowercase), and the protocols and standards defining the Internet define the basic model for most of current networking technology. Thus, in general, technology that applies to the Internet may also find application in other networks, as well.

The Internet is divided into a number of different "autonomous systems" (ASs), each of which contains one or more routers and/or LANs under the control of a single entity, such a university or business. Routers (also sometimes referred to as "gateways" in older literature) are network elements that relay (route) data between networks. Routers are connected to other routers via physical or sometimes wireless links. Data is routed through an internetwork by being forwarded from router to router over physical links until the proper destination network is reached. To forward information properly over a network, routers maintain "routing tables," which give the router guidance as to which link a given piece of information should be forwarded on. In actuality, both routers and non-router network elements (hosts) maintain routing tables, but routers are distinguished from other network elements by the fact that routers are programmed to forward data, while hosts are generally programmed to discard any data not addressed to that host.

Networking protocols, which define the rules for communication between network elements, are typically designed to work in layers, where each layer performs a slightly different role in data transmission. TCP/IP (Transmission Control Protocol/Internet Protocol) is a collection of protocols (called a protocol suite) that forms the basis for the Internet and many other networks. TCP/IP is typically used to transmit data across a wide area network in the form of relatively small chunks, alternatively known as packets or datagrams. TCP/IP is generally considered to follow a four-layer protocol model. The lowest layer of the TCP/IP protocol suite is referred to as the "Link Layer" and it represents the physical interface for supporting a connection to a physical network media, such as a cable or wireless link. The Network Layer, the next highest layer in the four-layer model, handles the movement of data packets around the network. Above the Network Layer is the Transport Layer, which controls the manner in which network packets are organized and used at the sending and receiving host computers themselves. The top layer of a typical TCP/IP protocol stack is the Application Layer, which represents the functionality for supporting a particular network application, such as E-mail (via Simple Mail Transfer Protocol, or "SMTP") or World Wide Web access (via HyperText Transfer Protocol, or "HTTP").

Internet Protocol (IP) is the primary Network Layer protocol of the TCP/IP protocol suite. There are two main versions of IP currently in use, version 4 (IPv4), which is defined in RFC 791, and version 6 (IPv6), which is defined in RFC 1883). IP allows packets of data to be sent from a numerical source address in the network to a numerical destination address specified in the packet's header. Typically, these packets are "encapsulated" in the packets of whatever Link Layer protocol is involved. This means that the IP packets are carried as data within the packets generated by a Link Layer protocol, such as Ethernet.

These numerical addresses in the TCP/IP protocol suite are therefore generally referred to as "IP addresses," although the generic, non-IP-specific term is "network addresses." Network addresses are different from hardware addresses, because network addresses are used to identify a network element over an entire WAN (e.g., the Internet), rather than to identify an NA among NAs on the same LAN. Thus, a given network element will have a hardware address corresponding to its NA and one or more network addresses that identify the network element over the WAN. IPv4 supports 32-bit IP addresses, while IPv6 supports 128-bit IP addresses, to accommodate the explosive growth in Internet-connected hosts.

Other network layer protocols, such as Internet Control Message Protocol version 4 (ICMPv4) (RFC 792) and Internet Group Management Protocol (IGMP) (RFC 1112) are used for sending control and error messages and for the grouping of IP addresses for multicasting of individual packets to multiple destinations in the group, respectively. As ICMPv4 was designed to be used in conjunction with IPv4, a new version of the protocol, ICMPv6 (RFC 1885), is required to be used in conjunction with IPv6.

One of the tasks typically performed by ICMP is known as "Path MTU discovery." The term "MTU" stands for "maximum transport unit," and it refers to the maximum allowable packet size between two nodes in an IP network. When packets are transmitted between any two linked nodes in an IP network, there is an MTU associated with that link. A typical IP packet will be routed through multiple routers (and, hence, multiple links) on its way to its destination host. Each link has an MTU value associated with it, which is typically a function of the link-layer protocol used for transport over that link (so that each IP packet can be encapsulated into a single link-layer packet, the maximum link-layer packet size will typically determine the MTU for the link). Because each link has an MTU associated with it, if the packet is to reach its intended destination, the packet must not exceed the MTU for any of the links along the path from the source host to the destination host. Hence, the minimum MTU over all of the links in a given path is referred to as the "path MTU" for that path. The sending host must generate IP packets that are no greater than the path MTU for the path used to reach the destination host.

The standard method for path MTU discovery is described in RFC 1191. Since a sending host will generally not be aware of the actual path taken by the packet to reach the destination host, what is discovered is actually the "path MTU" associated with each destination host. The path MTU for a given path is initially discovered using what might be characterized as a trial and error process using ICMP. If a router receives a packet that is larger than the MTU for the next link in the path, the router discards the packet and returns a datagram to the sending host containing the ICMP message "datagram too big," which also contains the MTU value for the next link in the path. The sending host adjusts its packet size (i.e., its estimate of "path MTU" for the particular destination host) to accommodate the MTU value returned and tries again. Eventually, the sending host reaches a path MTU value that works for sending packets to the destination host, and the sending host caches that path MTU for future use, so that the trial-and-error process does not have to be repeated (for as long as the path MTU continues to reside in the cache, anyway).

Under this path MTU discovery mechanism, a large, frequently used host (such as a World Wide Web search engine, for example), must either cache a very large number of path MTU values or it will suffer significant performance degradation when it must repeatedly calculate path MTU values for reoccurring destination hosts. Under either of these scenarios, extensive computing resources are required (be they network bandwidth, computing time, or storage cost).

What is needed, therefore, is a more efficient way for a frequently used network host to keep track of the correct path MTU to use for particular destination hosts. The present invention provides a solution to this and other problems, and offers other advantages over previous solutions.

SUMMARY OF THE INVENTION

Accordingly, the present invention provides a method, computer program product, and data processing system for efficiently discovering and storing path MTU information in a sending host. In a preferred embodiment, two path MTU tables are maintained. One path MTU table contains MTU values corresponding to the first-hop routers associated with the sending host. The other path MTU table contains MTU values corresponding to individual destination hosts for which the path MTU is lower than the MTU for the first-hop router used to reach that destination host. When the sending host needs to send information to a destination, it first consults the MTU table associated with individual destination hosts. If an entry for that destination host is found in the table, the sending host uses that MTU value. If not, the sending host consults the MTU table for the first-hop router on the path to the destination host and uses that MTU value. If that MTU value is too high to allow a packet to reach the intended destination, a new entry is made in the host-specific MTU table for the destination host.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

The following is intended to provide a detailed description of an example of the invention and should not be taken to be limiting of the invention itself. Rather, any number of variations may fall within the scope of the invention, which is defined in the claims following the description.

Figure 1:
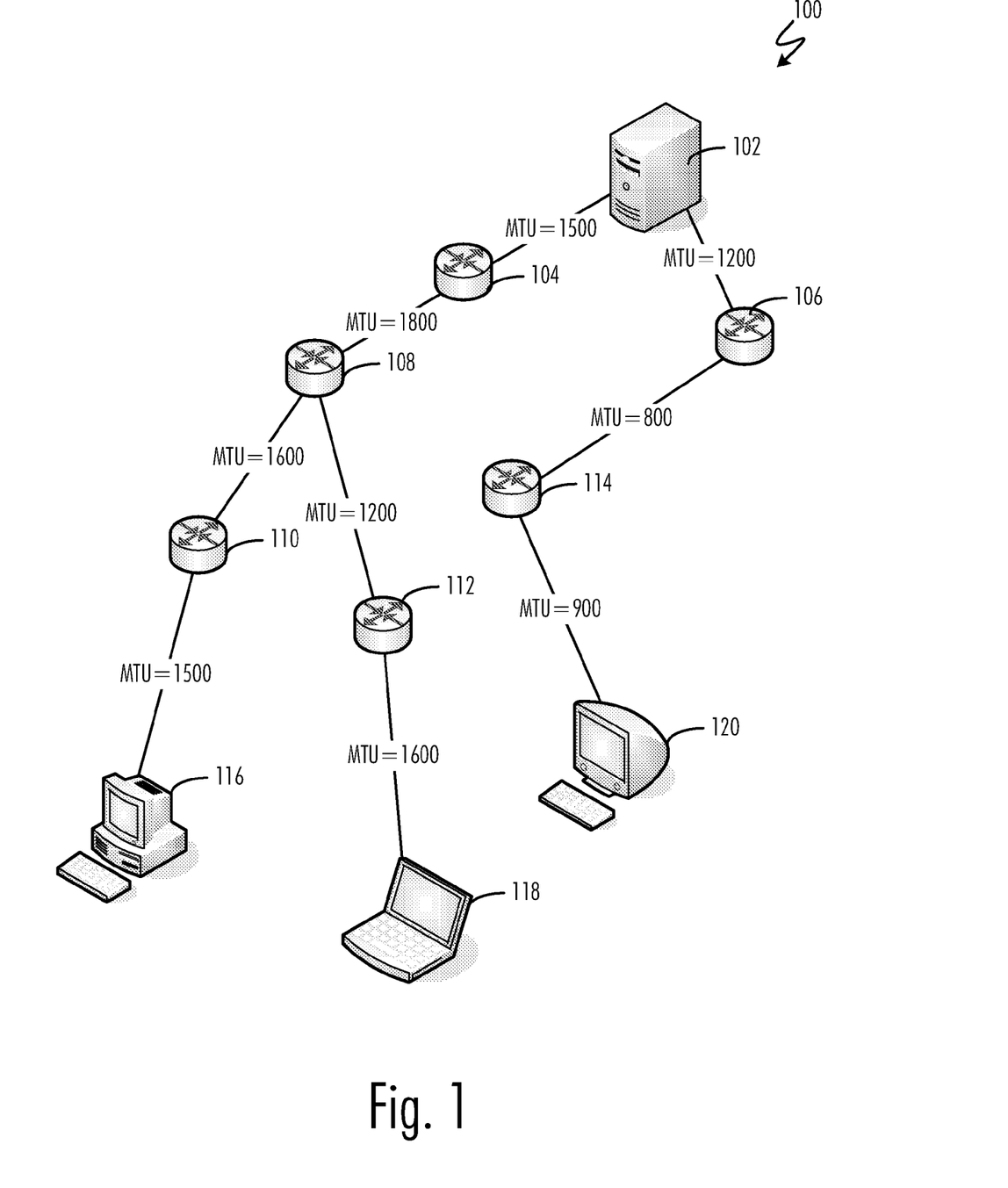
FIG. 1 is a diagram of a portion of a network in which a preferred embodiment of the present invention may be implemented.

FIG. 1 is a diagram of a portion 100 of a network in which a preferred embodiment of the present invention may be implemented. Network portion 100 is viewed from the perspective of a sending (source) host 102, which can data to any of a plurality of destination hosts 116, 118, and 120 through interconnected routers 104, 106, 108, 110, 112, and 114. One skilled in the art will recognize, however, that the terms "sending host" and "destination host" are understood to be relative to the roles played by two networked computers in a single data transmission. Any computer in a network that is sending data to another networked computer is a sending host for that data transmission; conversely, any computer in a network that is receiving data from another networked computer is a destination host for that data transmission.

As shown in FIG. 1, each connection between two nodes in network portion 100 has an associated MTU value. For example, the MTU for the link between host 102 and router 104 is 1500. For each combination of sending and destination hosts, there is a "path MTU," which represents the largest packet size allowable on the network path taken from the sending host to the destination host. The "path MTU" is the minimum MTU over all connections on the network path from the sending host to the destination host. For example, the path MTU between sending host 102 and destination host 116 is 1500, while the path MTU between sending host 102 and destination host 118 is 1200 (because the minimum MTU on the path from sending host 102 to destination host 118 is the MTU of 1200, which occurs between router 108 and router 112).

From FIG. 1 is it apparent that in any case, the path MTU from a sending host to a destination host is no greater than the MTU on the connection between the sending host and the "first-hop router" on the path to the destination host. The "first-hop router" is the first router encountered on the path between the sending host and destination host. For any given sending host, there is a finite number of first-hop routers (because there can only be a finite number of physical connections from a given sending host). For example, in FIG. 1, sending host 102 has two first-hop routers, router 104 and router 106. First-hop router 104 is the first-hop router on the paths to destination hosts 116 and 118, while first-hop router 106 is the first-hop router on the path to destination host 120. A preferred embodiment of the present invention reduces the amount of storage needed to store path MTU information in a sending host by taking advantage of the fact that the MTU to a given first-hop router is an upper bound on path MTU.

Figure 2:
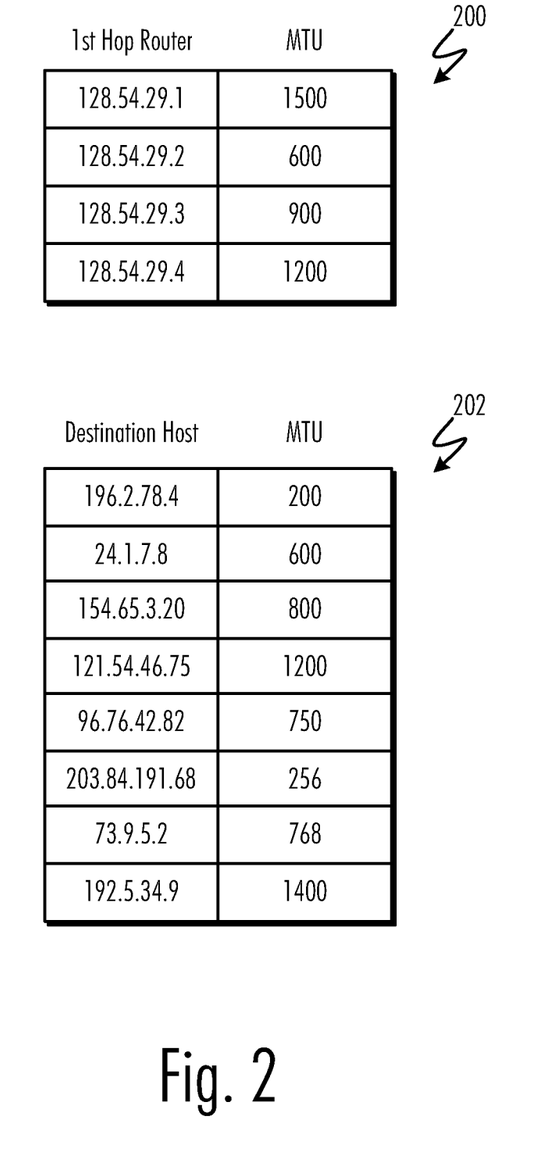
FIG. 2 is a diagram of a dual MTU table in accordance with a preferred embodiment of the present invention.

FIG. 2 is a diagram of a dual MTU table in accordance with a preferred embodiment of the present invention. In this preferred embodiment, a sending host maintains two path MTU tables (path MTU tables 200 and 202). Path MTU table 200 contains MTU values corresponding to the first-hop routers associated with the sending host. Path MTU table 202 contains MTU values corresponding to individual destination hosts for which the path MTU is lower than the MTU for the first-hop router used to reach that destination host. When the sending host needs to send information to a destination, it first consults MTU table 202. If an entry for that destination host is found in MTU table 202, the sending host uses that MTU value. If not, the sending host consults MTU table 200 to locate the MTU value associated with the first-hop router on the path to the destination host and uses that MTU value. If the first-hop router's MTU value turns out to be too high to allow a packet to reach the intended destination, a new entry is made in table 202 for the destination host with the actual path MTU value for that host.

For example, if no entry in table 202 exists for destination host 120 in FIG. 1, sending host 102 will first attempt to send a packet to destination host 120 using an MTU of 1200 for first-hop router 106, which sending host 102 retrieves from table 200. Since the MTU for the link between router 106 and router 114 is 800, the first-hop router MTU of 1200 is too high for transmitting packets to destination host 120 and router 106 will return an ICMP message to sending host 102 to inform sending host 102 that it must send packets that do not exceed the MTU of 800 between router 106 and router 114. In this case, sending host 102 will make a new entry in table 202 for destination host 120 containing the adjusted MTU of 800. This technique ensures that host-specific MTU information is only stored when absolutely necessary by using the first-hop router's MTU whenever possible.

Figure 3:
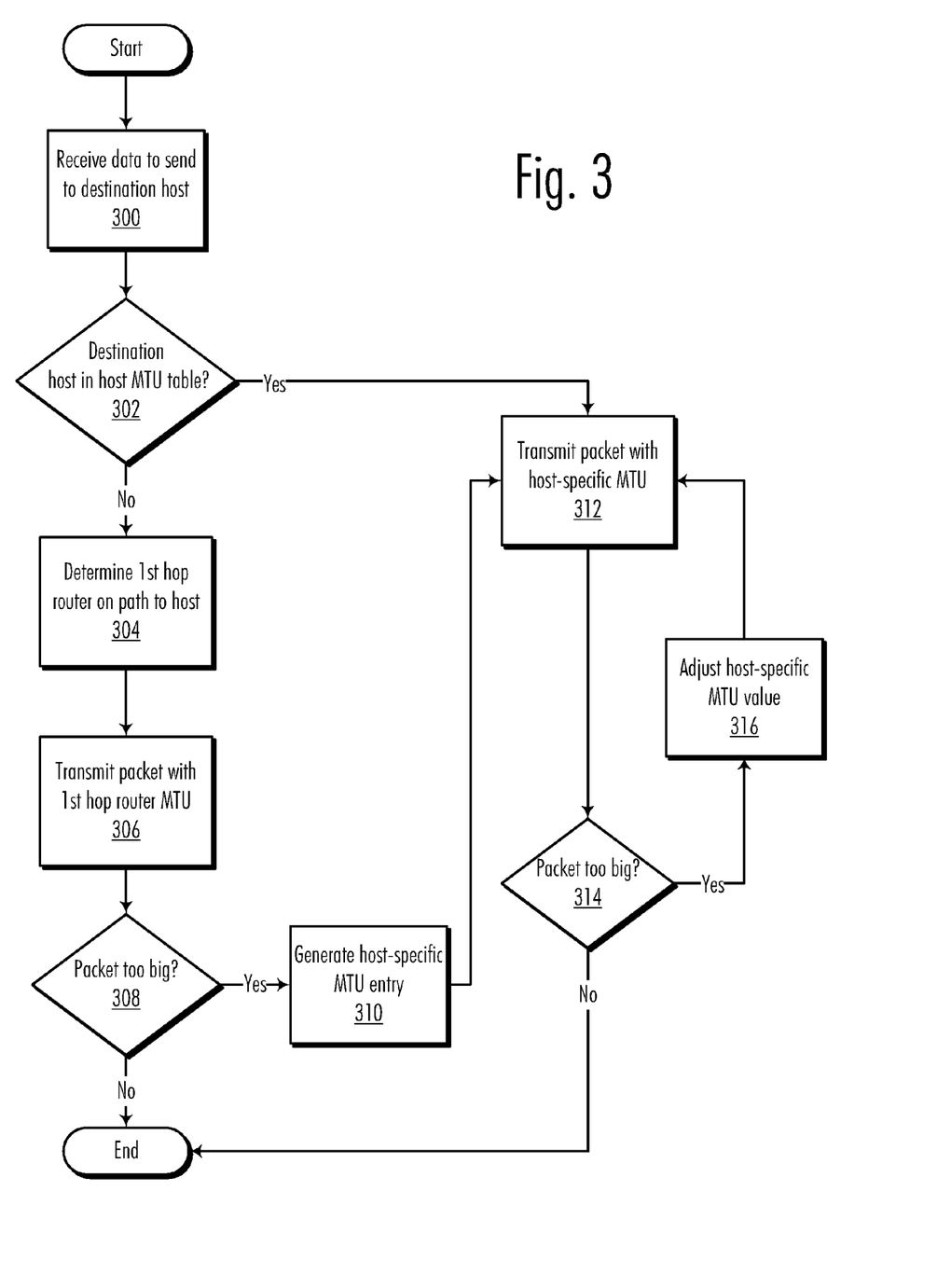
FIG. 3 is a flowchart representation of a process of MTU information discovery and storage in accordance with a preferred embodiment of the present invention.

FIG. 3 is a flowchart representation of a process of sending a single packet with MTU information discovery and storage in accordance with a preferred embodiment of the present invention. When a sending host has data to send to a destination host (block 300), a determination is first made as to whether the destination host has an entry in the host-specific MTU table (e.g., table 202 in FIG. 2) (block 302). If there is no host-specific entry for the destination host (block 302:No), then the first-hop router on the path to destination host is determined (block 304). An attempt is then made to transmit a packet of data using a packet size set by the MTU associated with this first-hop router (e.g., as determined from table 200 in FIG. 2) (block 306). If it is discovered that this first-hop router MTU is larger than the actual path MTU to the destination host (e.g., because an "packet size exceeded" ICMP message has been received) (block 308:Yes), then an entry storing an adjusted host-specific MTU (e.g., in table 202 in FIG. 2) is generated for the destination host (block 310). If no such "packet size exceeded" message is received (i.e, the packet sent was not too big) (block 308:No), the process of sending a single packet is complete: the process is repeated for the sending of subsequent packets, as necessary.

If there is a host-specific MTU value in the host MTU table, either because it was determined to exist a priori (block 302: Yes) or because it was just generated (block 310), a packet is transmitted with a packet size determined by this host-specific MTU value (block 312). If this packet (having a host-specific size) turns out to be too big to reach the destination (block 314:Yes), then the host-specific value stored in the host MTU table is adjusted (e.g., in accordance with the "packet size exceeded" ICMP message received) to overcome the failure (block 316) and an attempt to transmit a packet of this new, smaller size is made (block 312). This process repeats until a packet of the proper size has been transmitted and no more packet-size-related failures occur (block 314:No).

One skilled in the art will recognize that blocks 312, 314, and 316, in isolation, are equivalent to the MTU discovery mechanism described in the Internet standards document RFC-1191, which is incorporated herein by reference. Hence, one manner of implementing the present invention would be to augment/instrument existing MTU discovery code (implementing blocks 312, 314, and 316 as a "black box") with the functionality provided by blocks 300-310.

Figure 4:
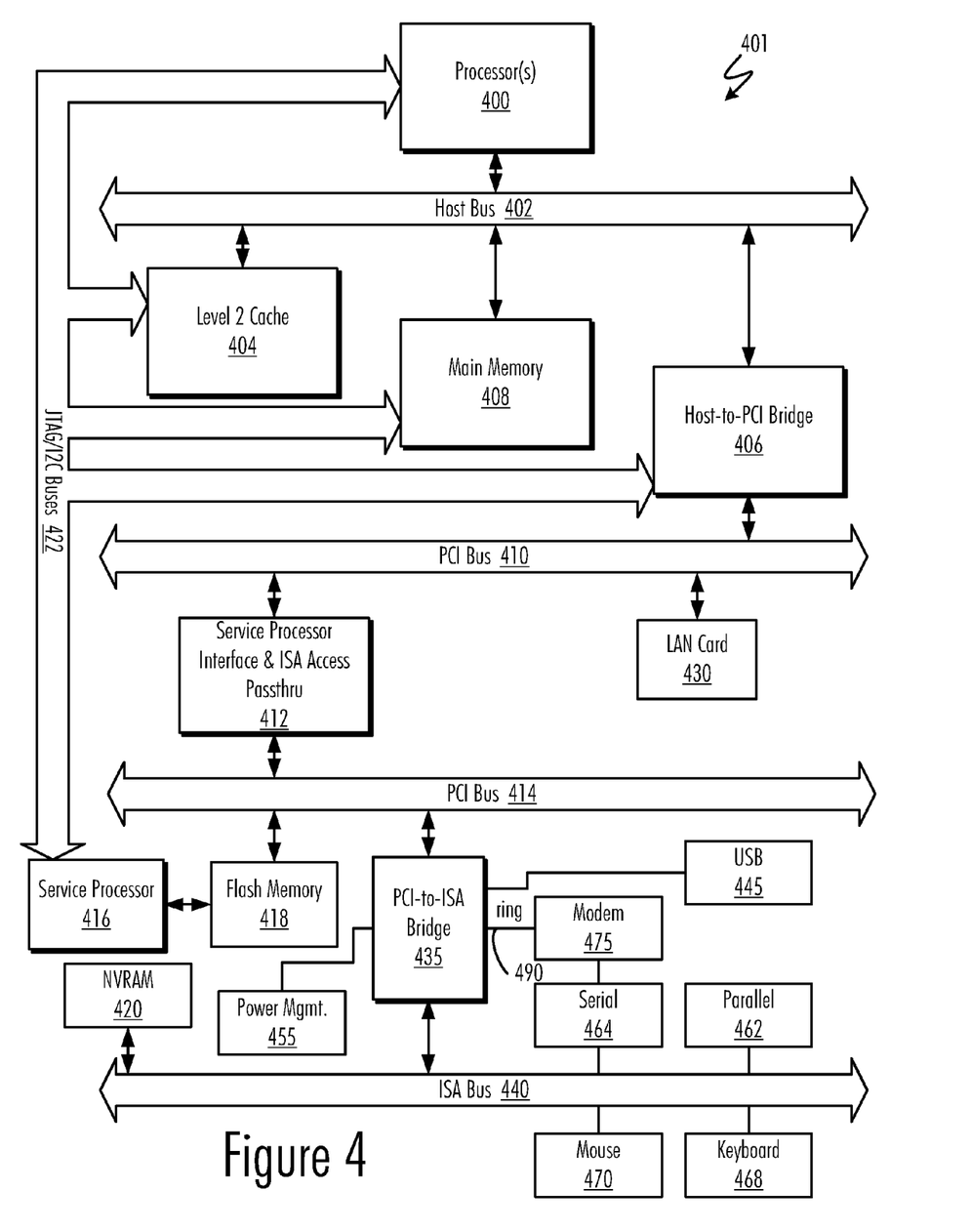
FIG. 4 is a block diagram of a data processing system in which a preferred embodiment of the present invention may be implemented.

FIG. 4 illustrates information handling system 401 which is a simplified example of a computer system/data processing system capable of performing the computing operations described herein with respect to a preferred embodiment of the present invention. Computer system 401 includes processor 400 which is coupled to host bus 402. A level two (L2) cache memory 404 is also coupled to host bus 402. Host-to-PCI bridge 406 is coupled to main memory 408, includes cache memory and main memory control functions, and provides bus control to handle transfers among PCI bus 410, processor 400, L2 cache 404, main memory 408, and host bus 402. Main memory 408 is coupled to Host-to-PCI bridge 406 as well as host bus 402. Devices used solely by host processor (s) 400, such as LAN card 430, are coupled to PCI bus 410. Service Processor Interface and ISA Access Pass-through 412 provides an interface between PCI bus 410 and PCI bus 414. In this manner, PCI bus 414 is insulated from PCI bus 410. Devices, such as flash memory 418, are coupled to PCI bus 414. In one implementation, flash memory 418 includes BIOS code that incorporates the necessary processor executable code for a variety of low-level system functions and system boot functions.

PCI bus 414 provides an interface for a variety of devices that are shared by host processor(s) 400 and Service Processor 416 including, for example, flash memory 418. PCI-to-ISA bridge 435 provides bus control to handle transfers between PCI bus 414 and ISA bus 440, universal serial bus (USB) functionality 445, power management functionality 455, and can include other functional elements not shown, such as a real-time clock (RTC), DMA control, interrupt support, and system management bus support. Nonvolatile RAM 420 is attached to ISA Bus 440. Service Processor 416 includes JTAG and I2C buses 422 for communication with processor(s) 400 during initialization steps. JTAG/I2C buses 422 are also coupled to L2 cache 404, Host-to-PCI bridge 406, and main memory 408 providing a communications path between the processor, the Service Processor, the L2 cache, the Host-to-PCI bridge, and the main memory. Service Processor 416 also has access to system power resources for powering down information handling device 401.

Peripheral devices and input/output (I/O) devices can be attached to various interfaces (e.g., parallel interface 462, serial interface 464, keyboard interface 468, and mouse interface 470 coupled to ISA bus 440. Alternatively, many I/O devices can be accommodated by a super I/O controller (not shown) attached to ISA bus 440.

In order to attach computer system 401 to another computer system to copy files over a network, LAN card 430 is coupled to PCI bus 410. Similarly, to connect computer system 401 to an ISP to connect to the Internet using a telephone line connection, modem 475 is connected to serial port 464 and PCI-to-ISA Bridge 435.

While the computer system described in FIG. 4 is capable of executing the processes described herein, this computer system is simply one example of a computer system. Those skilled in the art will appreciate that many other computer system designs are capable of performing the processes described herein.

One of the preferred implementations of the invention is a client application, namely, a set of instructions (program code) or other functional descriptive material in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps. Functional descriptive material is information that imparts functionality to a machine. Functional descriptive material includes, but is not limited to, computer programs, instructions, rules, facts, definitions of computable functions, objects, and data structures.

While particular embodiments of the present invention have been shown and described, it will be obvious to those skilled in the art that, based upon the teachings herein, changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an;" the same holds true for the use in the claims of definite articles. Where the word "or" is used in the claims, it is used in an inclusive sense (i.e., "A and/or B," as opposed to "either A or B").

What is claimed is:

1. A method comprising:
    storing, in a first maximum transmission unit (MTU) table, a first set of MTU values each corresponding to one of a plurality of first-hop routers associated with a sending host;
    identifying a first-hop router of the plurality of first-hop routers, wherein the first first-hop router is on a network path that comprises the sending host, the identified first-hop router, and a destination host;
    determining whether a second MTU table includes an entry corresponding to the destination host;
    in response to a determination that the second MTU table does not include an entry corresponding to the destination host:
        determining, from the first MTU table, a first MTU value corresponding to the identified first-hop router;
        generating a first packet of a size defined by the first MTU value;
        begin transmitting the first data packet through the network path to the destination host;
        receiving a notification that the first data packet failed to reach the destination host, wherein the notification indicates that a required path MTU value for the network path is smaller than the first MTU value; and
        in response to receiving the notification that the first data packet has failed to reach the destination host, storing, in the second MTU table, the required path MTU value as associated with the destination host,
    wherein the second MTU table contains only MTU values corresponding to one or more individual destination hosts for which an associated required path MTU value from the sending host to the one or more individual destination hosts is smaller than the MTU value for the first-hop router used to reach each of the one or more individual destination hosts, and
    wherein the first MTU table and second MTU table are maintained by the sending host.

2. The method of claim 1, further comprising:
    transmitting a second data packet from the sending host to the destination host by:
        determining that the required path MTU value for the destination host is stored in the second MTU table; and
        in response to determining that the required path MTU value for the destination host is stored in the second MTU table: transmitting the second data packet to the destination host, wherein the second data packet is generated of a size defined by the stored required path MTU value for the destination host in the second MTU table.

3. The method of claim 1, further comprising:
    transmitting a third data packet to a second destination host through a second network path that comprises the sending host, the identified first-hop router, and the second destination host, by:
        determining that an required path MTU value for the second destination host is not stored in the second MTU table; and
        in response to determining that the required path MTU value for the second destination host is not stored in the second MTU table, transmitting the third data packet to the second destination host, wherein the size of the third data packet is defined by the first MTU value in the first MTU table.

4. The method of claim 1, wherein the notification that the first data packet failed to reach the destination host indicates that the data packet failed to reach the destination host because of excessive packet size, the method further comprising:
    adjusting the size of the first data packet to a new smaller size to overcome the failure;
    attempting to retransmit the adjusted data packet to the destination host; and
    in response to detecting a second failure, repeating the adjusting and attempting until no more packet size related failures occur.

5. The method of claim 4, further comprising:
    determining the required path MTU value for the destination host from the size of the adjusted data packet that is retransmitted and no more packet size related failures occur.

6. The method of claim 1, wherein the first data packet is transmitted using Internet Protocol (IP).

7. A method comprising:
   storing, in a first maximum transmission unit (MTU) table, a first set of MTU values each corresponding to one of a plurality of first-hop routers associated with a sending host;
   storing, in a second MTU table, a second set of MTU values each corresponding to one of at least one of a plurality of destination hosts, wherein the second MTU table contains entries for each of the plurality of destination hosts for which a required path MTU value corresponding to a network path from the sending host to the destination host is smaller than the MTU value for the first-hop router on the network path; and
   transmitting, from the sending host, a data packet to a particular destination host by:
      determining whether a MTU value for the particular destination host is stored in the second MTU table;
      in response to a determination that the MTU value for the particular destination host is stored in the second MTU table, retrieving the MTU value from the second MTU table;
      in response to a determination that the MTU value for the particular destination host is not stored in the second MTU table, retrieving, from the first table, the MTU value for a first-hop router on the network path from the sending host to the particular destination host;
      generating a data packet of a size defined by the MTU value; and
      transmitting the data packet having a size that is determined by the retrieved MTU value;
      wherein the MTU value for the first-hop router is an upper bound on the MTU value for a network path comprising the first-hop router.

8. The method of claim 7, further comprising:
   determining whether the required path MTU value for the network path is smaller than the retrieved value; and
   in response to a determination that the required path MTU value for the network path is smaller than the retrieved MTU value, storing the required path MTU value as being associated with the destination host in the second MTU table,
   wherein the first MTU table and the second MTU table are maintained by the sending host.

9. The method of claim 7, further comprising:
   detecting a failure of the data packet to reach the particular destination host because of excessive packet size;
   in response to detecting that the data packet failed to reach the particular destination host because of excessive packet size, adjusting the size of the data packet to a new smaller size to overcome the failure;
   attempting to retransmit the adjusted data packet to the particular destination host; and
   in response to detecting a second failure, repeating the adjusting and attempting until no more packet size related failures occur.

10. The method of claim 9, further comprising:
   determining the required path MTU value for the network path from the size of the adjusted data packet.

11. The method of claim 7, wherein the data packet is transmitted using Internet Protocol (IP).

12. A computer program product embodied in hardware comprising a non-transitory functional descriptive material thereon that imparts functionality to a computer, and which when executed by the computer, causes the computer to perform actions that include:
   storing, in a first maximum transmission unit (MTU) table, a first set of MTU values each corresponding to one of a plurality of first-hop routers associated with a sending host;
   identifying a first-hop router of the plurality of first-hop routers, wherein the first first-hop router is on a network path that comprises the sending host, the identified first-hop router, and a destination host;
   determining whether a second MTU table includes an entry corresponding to the destination host;
   in response to a determination that the second MTU table does not include an entry corresponding to the destination host:
      determining, from the first MTU table, a first MTU value corresponding to the identified first-hop router;
      generating a first packet of a size defined by the first MTU value;
      begin transmitting the first data packet through the network path to the destination host;
      receiving a notification that the first data packet failed to reach the destination host, wherein the notification indicates that a required path MTU value for the network path is smaller than the first MTU value; and
      in response to receiving the notification that the first data packet has failed to reach the destination host, storing, in a second MTU table, the required path MTU value as associated with the destination host,
      wherein the second MTU table contains MTU values corresponding to one or more individual destination hosts for which an associated required path MTU value from the sending host to the one or more individual destination hosts is smaller than the MTU value for the first-hop router used to reach each of the one or more individual destination hosts, and
      wherein the first MTU table and second MTU table are maintained by the sending host.

13. The computer program product of claim 12, further comprising non-transitory functional descriptive material that, when executed by the computer, causes the computer to perform additional actions that include:
   transmitting a second data packet from the sending host to the destination host by:
      determining that the required path MTU value for the destination host is stored in the second MTU table; and
      in response to determining that the required path MTU value for the destination host is stored in the second MTU table: transmitting the second data packet to the destination host, wherein the second data packet is generated of a size defined by the stored required path MTU value for the destination host in the second MTU table.

14. The computer program product of claim 12, further comprising non-transitory functional descriptive material that, when executed by the computer, causes the computer to perform additional actions that include:
   transmitting a third data packet to a second destination host through a second network path that comprises the sending host, the identified first-hop router, and the second destination host, by:
      determining that a required path MTU value for the second destination host is not stored in the second MTU table; and
      in response to determining that the required path MTU value for the second destination host is not stored in the second MTU table, transmitting the third data packet to the second destination host, wherein the size of the third data packet is defined by the first MTU value in the first MTU table.

15. The computer program product of claim 12, wherein the notification that the first data packet failed to reach the destination host indicates that the data packet failed to reach the destination host because of excessive packet size;
the computer program product further comprising non-transitory functional descriptive material that, when executed by the computer, causes the computer to perform additional actions that include:
adjusting the size of the first data packet to a new smaller size to overcome the failure;
attempting to retransmit the adjusted data packet to the destination host; and
in response to detecting a second failure, repeating the adjusting and attempting until no more packet size related failures occur.

16. The computer program product of claim 15, further comprising non-transitory functional descriptive material that, when executed by the computer, causes the computer to perform additional actions that include:
determining the required path MTU value for the destination host from the size of the adjusted data packet that is retransmitted and no more packet size related failures occur.

17. The computer program product of claim 12, wherein the first data packet is transmitted using Internet Protocol (IP).

18. A computer program product embodied in hardware comprising non-transitory functional descriptive material thereon that imparts functionality to a computer, and when executed by a computer, causes the computer to perform actions that include:
storing, in a first maximum transmission unit (MTU) table, a first set of MTU values each corresponding to one of a plurality of first-hop routers associated with a sending host;
storing, in a second MTU table, a second set of MTU values each corresponding to one of at least one of a plurality of destination hosts, wherein the second MTU table contains entries for each of the plurality of destination hosts for which a required path MTU value corresponding to a network path from the sending host to the destination host is smaller than the MTU value for the first-hop router on the network path; and
transmitting, from the sending host, a data packet to a particular destination host by:
determining whether a MTU value for the particular destination host is stored in the second MTU table;
in response to a determination that the MTU value for the particular destination host is stored in the second MTU table, retrieving the MTU value from the second MTU table;
in response to a determination that the MTU value for the particular destination host is not stored in the second MTU table, retrieving, from the first table, the MTU value for a first-hop router on the network path from the sending host to the particular destination host; and
generating a data packet of a size defined by the MTU value; and
transmitting the data packet having a size that is determined by the retrieved MTU value;
wherein the MTU value for the first-hop router is an upper bound on the MTU value for a network path comprising the first-hop router.

19. The computer program product of claim 18, further comprising non-transitory functional descriptive material that, when executed by the computer, causes the computer to perform additional actions that include:
determining whether the required path MTU value for the network path is smaller than the retrieved value; and
in response to a determination that the required path MTU value for the network path is smaller than the retrieved MTU value, storing the required path MTU value as being associated with the destination host in the second MTU table,
wherein the first MTU table and the second MTU table are maintained by the sending host.

20. The computer program product of claim 18, further comprising non-transitory functional descriptive material that, when executed by the computer, causes the computer to perform additional actions that include:
detecting a failure of the data packet to reach the particular destination host because of excessive packet size;
in response to detecting that the data packet failed to reach the particular destination host because of excessive packet size, adjusting the size of the data packet to a new smaller size to overcome the failure;
attempting to retransmit the adjusted data packet to the particular destination host; and
in response to detecting a second failure, repeating the adjusting and attempting until no more packet size related failures occur.

21. The computer program product of claim 20, further comprising non-transitory functional descriptive material that, when executed by the computer, causes the computer to perform additional actions that include:
determining the required path MTU value for the network path from the size of the adjusted data packet.

22. The computer program product of claim 18, wherein the data packet is transmitted using Internet Protocol (IP).

23. A data processing system comprising:
at least one processor;
data storage accessible to the at least one processor; and
a set of instructions in the data storage, wherein the at least one processor executes the set of instructions to perform actions that include:
storing, in a first maximum transmission unit (MTU) table, a first set of MTU values each corresponding to one of a plurality of first-hop routers associated with a sending host;
identifying a first-hop router of the plurality of first-hop routers, wherein the first first-hop router is on a network path that comprises the sending host, the identified first-hop router, and a destination host;
determining whether a second MTU table includes an entry corresponding to the destination host;
in response to a determination that the second MTU table does not include an entry corresponding to the destination host:
determining, from the first MTU table, a first MTU value corresponding to the identified first-hop router;
generating a first packet of a size defined by the first MTU value;
begin transmitting the first data packet through the network path to the destination host;
receiving a notification that the first data packet failed to reach the destination host, wherein the notification indicates that a required path MTU value for the network path is smaller than the first MTU value; and
in response to receiving the notification that the first data packet has failed to reach the destination host, storing, in a second MTU table, the required path MTU value as associated with the destination host,
wherein the second MTU table contains MTU values corresponding to one or more individual destination hosts for which an associated required path MTU value from the sending host to the one or more individual destination hosts is smaller than the MTU value for the first-hop router used to reach each of the one or more individual destination hosts, and
wherein the first MTU table and second MTU table are maintained by the sending host.

24. The data processing system of claim 23, wherein the at least one processor executes the set of instructions to perform additional actions that include:
transmitting a second data packet from the sending host to the destination host by:
determining that the required path MTU value for the destination host is stored in the second MTU table; and
in response to determining that the required path MTU value for the destination host is stored in the second MTU table: transmitting the second data packet to the destination host, wherein the second data packet is generated of a size defined by the stored required path MTU value for the destination host in the second MTU table.

25. The data processing system of claim 23, wherein the at least one processor executes the set of instructions to perform additional actions that include:
transmitting a third data packet to a second destination host through a second network path that comprises the sending host, the identified first-hop router, and the second destination host, by:
determining that a required path MTU value for the second destination host is not stored in the second MTU table; and
in response to determining that the required path MTU value for the second destination host is not stored in the second MTU table, transmitting the third data packet to the second destination host, wherein the size of the third data packet is defined by the first MTU value in the first MTU table.

26. The data processing system of claim 23, wherein the notification that the first data packet failed to reach the destination host indicates that the data packet failed to reach the destination host because of excessive packet size;
wherein the at least one processor executes the set of instructions to perform additional actions that include:
adjusting the size of the first data packet to a new smaller size to overcome the failure;
attempting to retransmit the adjusted data packet to the destination host; and
in response to detecting a second failure, repeating the adjusting and attempting until no more packet size related failures occur.

27. The data processing system of claim 26, wherein the at least one processor executes the set of instructions to perform additional actions that include:
determining the required path MTU value for the destination host from the size of the adjusted data packet that is retransmitted and no more packet size related failures occur.

28. The data processing system of claim 23, wherein the first data packet is transmitted using Internet Protocol (IP).

* * * * *